(12) United States Patent
Ai et al.

(10) Patent No.: US 10,348,871 B2
(45) Date of Patent: Jul. 9, 2019

(54) TRANSMISSION STACK FOR EXTREMELY HIGH FREQUENCY WIRELESS COMMUNICATION

(71) Applicant: Essential Products, Inc., Palo Alto, CA (US)

(72) Inventors: Jiang Ai, San Jose, CA (US); William Francis Leggett, San Jose, CA (US); Paulina Mustafa, Palo Alto, CA (US); Nikola Cargonja, Palo Alto, CA (US); Jason Sean Gagne-Keats, Cupertino, CA (US); David John Evans, V, Palo Alto, CA (US); Adithya Gajulapally, Palo Alto, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/918,980

(22) Filed: Mar. 12, 2018

(65) Prior Publication Data
US 2019/0007532 A1 Jan. 3, 2019

Related U.S. Application Data

(60) Provisional application No. 62/544,713, filed on Aug. 11, 2017, provisional application No. 62/528,357, filed on Jul. 3, 2017.

(51) Int. Cl.
*H04M 1/02* (2006.01)
*H04M 1/725* (2006.01)
*H04B 1/3827* (2015.01)

(52) U.S. Cl.
CPC ......... *H04M 1/0202* (2013.01); *H04M 1/026* (2013.01); *H04M 1/7253* (2013.01); *H04B 1/3827* (2013.01); *H04M 1/0256* (2013.01)

(58) Field of Classification Search
CPC ......... G06F 3/048; H04B 5/0031; H04L 9/30; H04W 40/20; H04W 84/12
See application file for complete search history.

(56) References Cited

U.S. PATENT DOCUMENTS 10,165,426 B1 * 12/2018 Jiang ..................... H04W 16/28
2007/0089527 A1 * 4/2007 Shank .................... B60N 2/002
73/780

(Continued)

*Primary Examiner* — Lewis G West
(74) *Attorney, Agent, or Firm* — Perkins Coie LLP

(57) ABSTRACT

Disclosed here are systems and methods which enable high-bandwidth communication between a mobile device and an accessory. The high-bandwidth communication uses electromagnetic waves in the extremely high frequency range between 30 GHz and 300 GHz inclusive, also known as millimeter waves. The millimeter waves travel through at least the chassis of the accessory and the chassis of the mobile device without significant scattering and attenuation. The properties of the materials through which the millimeter waves travel determine the attenuation of the millimeter waves. Disclosed here are various materials, and their thicknesses, which form a transmission stack through which the millimeter waves can travel unimpeded. In effect, the transmission stack acts as a dielectric member which facilitates the transmission of the millimeter waves, while attenuating transmission of waves outside of the extremely high frequency range.

13 Claims, 10 Drawing Sheets

(56) References Cited

U.S. PATENT DOCUMENTS

| | | | |
|---|---|---|---|
| 2015/0168486 A1* | 6/2015 | Isaac | G01R 1/045 |
| | | | 324/756.02 |
| 2017/0222301 A1* | 8/2017 | Shiu | H04B 1/3888 |
| 2018/0123253 A1* | 5/2018 | Weinmann | H01Q 13/02 |
| 2018/0277927 A1* | 9/2018 | McCormack | H04B 1/18 |
| 2018/0323834 A1* | 11/2018 | Jiang | H04B 7/0408 |

\* cited by examiner

TRANSMISSION STACK FOR EXTREMELY HIGH FREQUENCY WIRELESS COMMUNICATION

CROSS-REFERENCE TO RELATED APPLICATIONS

This application claims priority to the U.S. provisional patent application Ser. No. 62/528,357 filed Jul. 3, 2017, and U.S. provisional patent application Ser. No. 62/544,713 filed Aug. 11, 2017 both of which are incorporated herein by this reference in their entirety.

TECHNICAL FIELD

The present application is related to mobile devices, and more specifically to methods and systems that enable wireless communication between a mobile device and an accessory at extremely high frequencies.

BACKGROUND

Today, wireless communication between mobile devices and accessories are supported by protocols such as Bluetooth and Wi-Fi direct. These protocols provide speeds of up to 25 Mb per second. With accessories, such as 360° cameras providing bandwidth intensive information to the mobile device, the existing protocols do not provide the necessary bandwidth.

SUMMARY

Disclosed here are systems and methods which enable high-bandwidth communication between a mobile device and an accessory. The high-bandwidth communication uses electromagnetic waves in the extremely high frequency range between 30 GHz and 300 GHz inclusive, also known as millimeter waves. The millimeter waves travel through at least the chassis of the accessory and the chassis of the mobile device without significant scattering and attenuation. The properties of the materials through which the millimeter waves travel determine the attenuation of the millimeter waves. Disclosed here are various materials, and their thicknesses, which form a transmission stack through which the millimeter waves can travel unimpeded. In effect, the transmission stack acts as a dielectric member which facilitates the transmission of the millimeter waves, while attenuating transmission of waves outside of the extremely high frequency range.

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

DETAILED DESCRIPTION

Terminology

Figure 1:
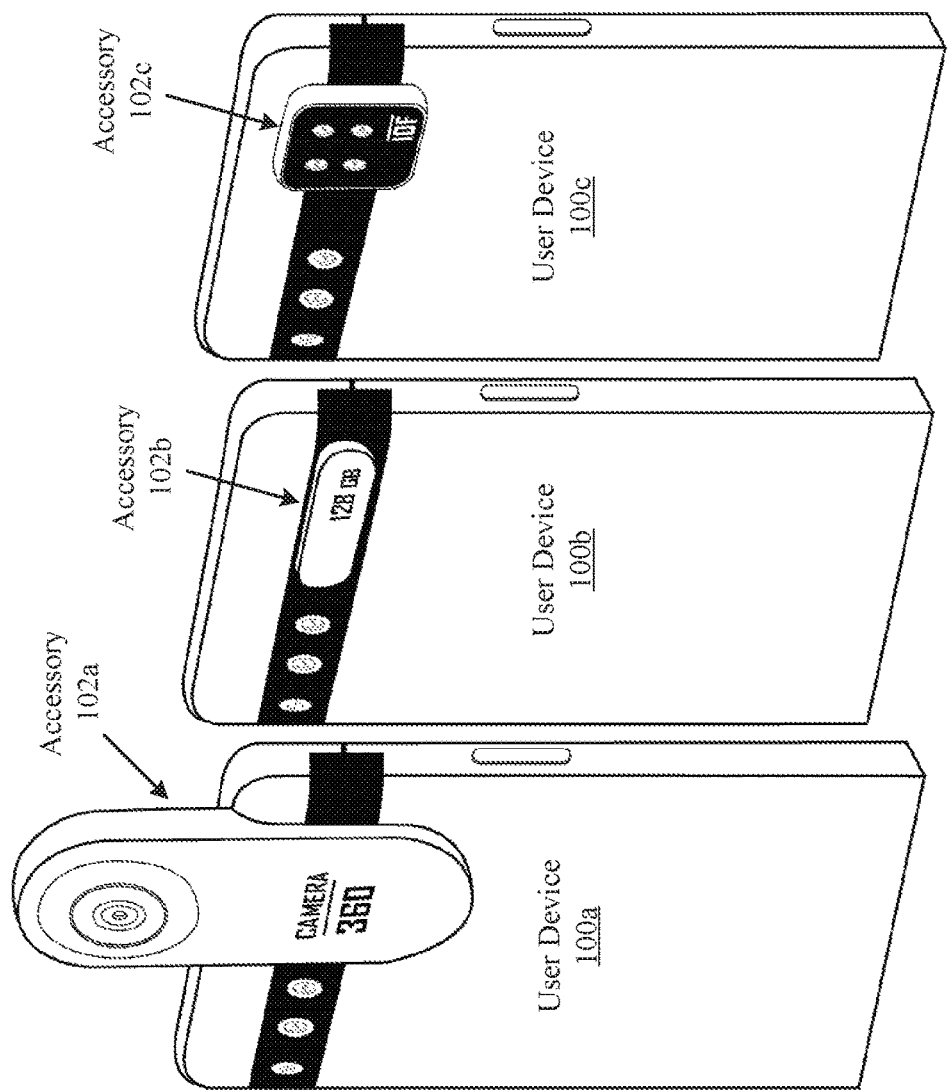
FIG. 1 depicts various accessories that are attached to user devices that include wireless accessory busses.

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Transmission Stack for Extremely High Frequency Wireless Communication

Disclosed here are systems and methods which enable high-bandwidth communication between a mobile device and an accessory. The high-bandwidth communication uses electromagnetic waves in the extremely high frequency range between 30 GHz and 300 GHz inclusive, also known as millimeter waves. The millimeter waves travel through at least the chassis of the accessory and the chassis of the mobile device without significant scattering and attenuation. The properties of the materials through which the millimeter waves travel determine the attenuation of the millimeter waves. Disclosed here are various materials, and their thicknesses, which form a transmission stack through which the millimeter waves can travel unimpeded. In effect, the transmission stack acts as a dielectric member which facilitates the transmission of the millimeter waves, while attenuating transmission of waves outside of the extremely high frequency range.

FIG. 1 depicts various accessories 102a-c that are attached to user devices 100a-c that include wireless accessory busses. The user devices 100a-c can be a mobile phone, a tablet, personal digital assistant, a monitor, a laptop computer, etc. The accessories 102a-c can be a camera, a 360° camera, an external memory, a battery pack, an acoustic transducer, an external display, etc. A single accessory 102a-c can have one or more of the above listed functionalities. The user devices 100a-c communicate with the accessories 102a-c wirelessly using extremely high electromagnetic frequencies in the range 30 to 300 GHz, inclusive.

For example, attaching an external display to the backside of the user device 100a-c can create a user device with two displays. The front and the back display can be identical, or the front and the back display can complement each other.

In another example, attaching a 360° camera requires a high-bandwidth communication between the accessory 102a-c and the user device 100a-c because of the size of the data captured by the 360° camera. For example, the 360° camera can capture a video sequence, which effectively means capturing 30 frames per second from two cameras at cell phone camera resolution. This roughly translates into 128 Mbits*30 frames/second*2=7.7 Gbits/second. For comparison, Bluetooth 4.0 provides speeds up to 25 Mbits/second. Consequently, Bluetooth cannot support the required bandwidth.

The accessories 102a-c are normally designed so that each accessory can be easily attached to and removed from the wireless accessory bus without modification. Moreover, a user device is normally configured to automatically establish a communication channel between the user device and the accessory and/or automatically begin transferring power to the accessory. Consequently, the accessory may be usable immediately or soon after attachment to the wireless accessory bus of the user device.

As described in this application, the accessory, the user device, or both could include fastening components (e.g., magnets and/or mechanical connectors) that allow the accessory and the user device to be securely and detachably connected to one another. Said another way, the accessory and the user device may be capable of being readily and repeatedly attached and detached from one another. Consequently, a user could elect to quickly utilize a series of accessories in succession by a single user device.

In some embodiments, an application associated with an accessory is initiated in response to determining the accessory has been attached to the wireless accessory bus of the user device. For example, attaching accessory 102a (a 360° camera) or accessory 102c (a multi-LED illumination source) may prompt a camera application to be invoked, while attaching accessory 102b (an external storage device) may prompt a data storage application to be invoked.

Figure 2:
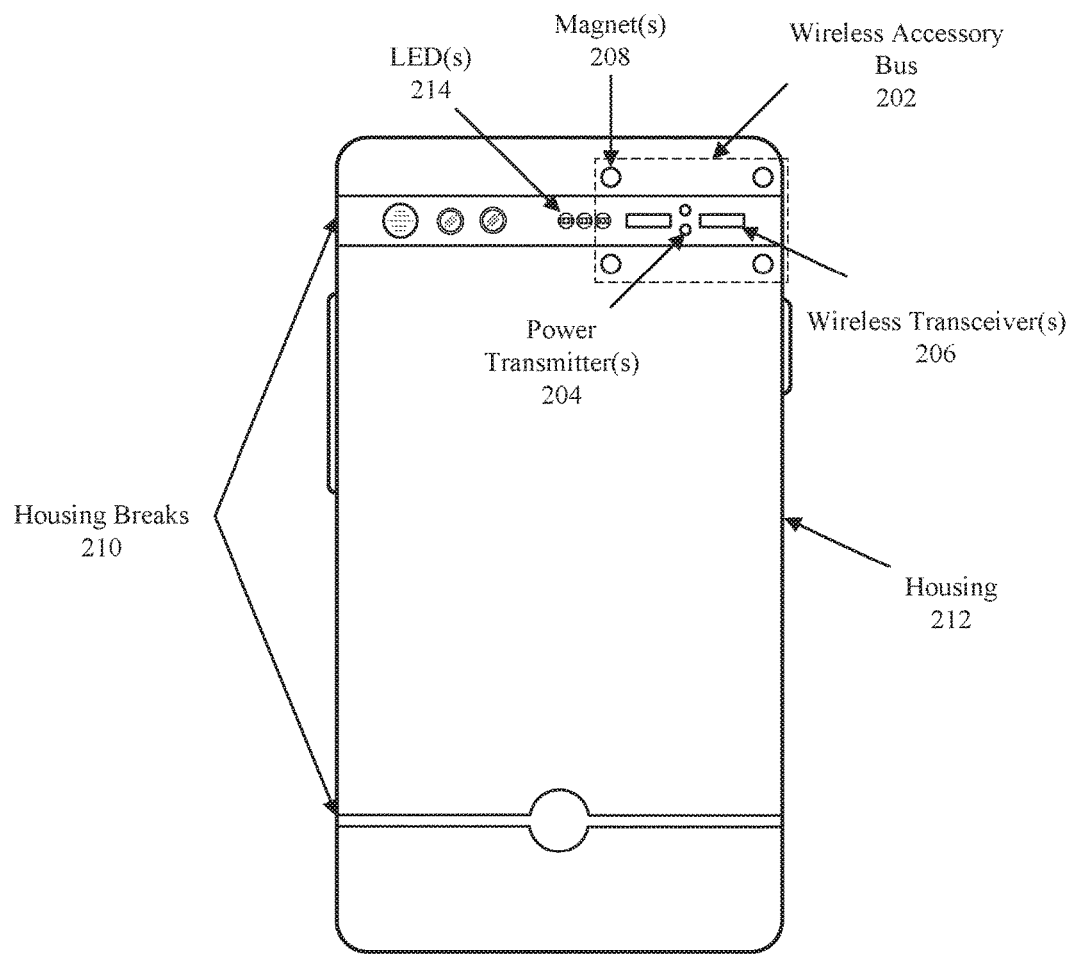
FIG. 2 is a rear view of a user device 200 that includes a wireless accessory bus capable of receiving an accessory.

FIG. 2 is a rear view of a user device 200 that includes a wireless accessory bus 202 capable of receiving an accessory. The wireless accessory bus 202 enables data and/or power to be wirelessly transferred from the user device 200 to the accessory (or vice versa) when the user device 200 and the accessory are within close proximity to one another. For example, a bi-directional communication channel may be established when the accessory is securely attached to the wireless accessory bus 202.

As shown in FIG. 2, the term "wireless accessory bus" refers generally to an area of the user device 200 that is configured to securely receive an accessory. The wireless accessory bus 202 can include one or more power transmitters 204, one or more wireless transceivers 206, and/or one or more magnets 208 (collectively referred to as the "bus components").

Some of these bus components could be at least partially exposed. For example, the magnet(s) 208 may be exposed through opening(s) in the housing 212. Additionally or alternatively, some of these bus components could be secured within the housing 212. In such embodiments, the bus components may be selected in order to compensate for signal degradation that occurs as the data signals and/or power signals traverse through the housing 212 or a substrate laid within a break 210 in the housing 212. The substrate may be an optically-clear substrate, such as glass or plastic.

The power transmitter(s) 204 are configured to transfer power between a power supply (e.g., a battery) retained within the housing 212 and an accessory via a wired or wireless electrical coupling. The transmitted power can be used to charge the accessory, or to charge the power supply within the housing 212. For example, the power transmitter(s) 204 may include one or more electrical contacts (e.g., pin terminals) that are able to physically contact one or more electrical contacts of the accessory. As another example, the power transmitter(s) 204 may include integrated circuits ("chips") that are able to wirelessly transmit power from the user device to the accessory. The wireless power transmitter(s) 204 may be configured to transmit power in accordance with the Qi standard developed by the Wireless Power Consortium or some other wireless power standard.

The wireless transceiver(s) 206 are communicatively coupled to one or more wireless transceivers of the accessory. For the purposes of illustration and simplification, the term "wireless transceiver" is intended to cover components able to transmit data, receive data, or both. Moreover, a single wireless transceiver could include distinct components responsible for transmitting and receiving data signals.

Upon determining an accessory has been securely attached to the wireless accessory bus 202, the wireless transceiver(s) 206 may be configured to automatically initiate a connection with the wireless transceiver(s) of the accessory. For example, if the accessory includes multiple digital cameras, image data may be received by the wireless transceiver(s) 206 from the accessory. In some embodiments, an application associated with the accessory could also be downloaded from a network-accessible environment (e.g., a digital distribution platform such as a website or an app store) and/or launched in response to determining an accessory has been securely attached to the wireless accessory bus 202.

Oftentimes, the wireless accessory bus 202 includes a fastening component that enables the accessory to be securely attached to the user device 200. Here, for example, magnet(s) 208 are arranged around the wireless accessory bus 202 so that the accessory is in a predetermined orientation when attached to the user device 200. However, other materials and components could also be used. For example, a magnetic film could be deposited on an outer or inner surface of the housing 212 and/or a mechanical track, clips, etc., could be affixed to the housing 212. The predetermined orientation may cause a wireless transmitter of the accessory to be aligned with, or disposed in close proximity to, the wireless transceiver(s) 206 of the user device 200.

The housing 212 also typically includes one or more breaks 210. These break(s) 210 may be necessary for permitting antenna(s) within the housing to send and receive signals or could be for stylistic/aesthetic purposes. These break(s) 210 typically include a substrate layer comprised of a non-metal material, such as glass or plastic, that allows signals to more readily pass through.

As shown in FIG. 2, the wireless accessory bus 202 could be positioned in or around one of the break(s) 210. In such embodiments, one or more light emitting diodes (LEDs) 214 may be disposed underneath the substrate layer and configured to convey information about the user device 200 and/or the accessory. For example, the LEDs 214 could illuminate when the accessory is brought near the user device 200, thereby indicating where the accessory should be attached. As another example, the LEDs 214 may be able to convey operational information, such as whether the accessory is receiving sufficient power, is able to transfer data signals to the user device, is currently available for use, etc.

Figure 3A:
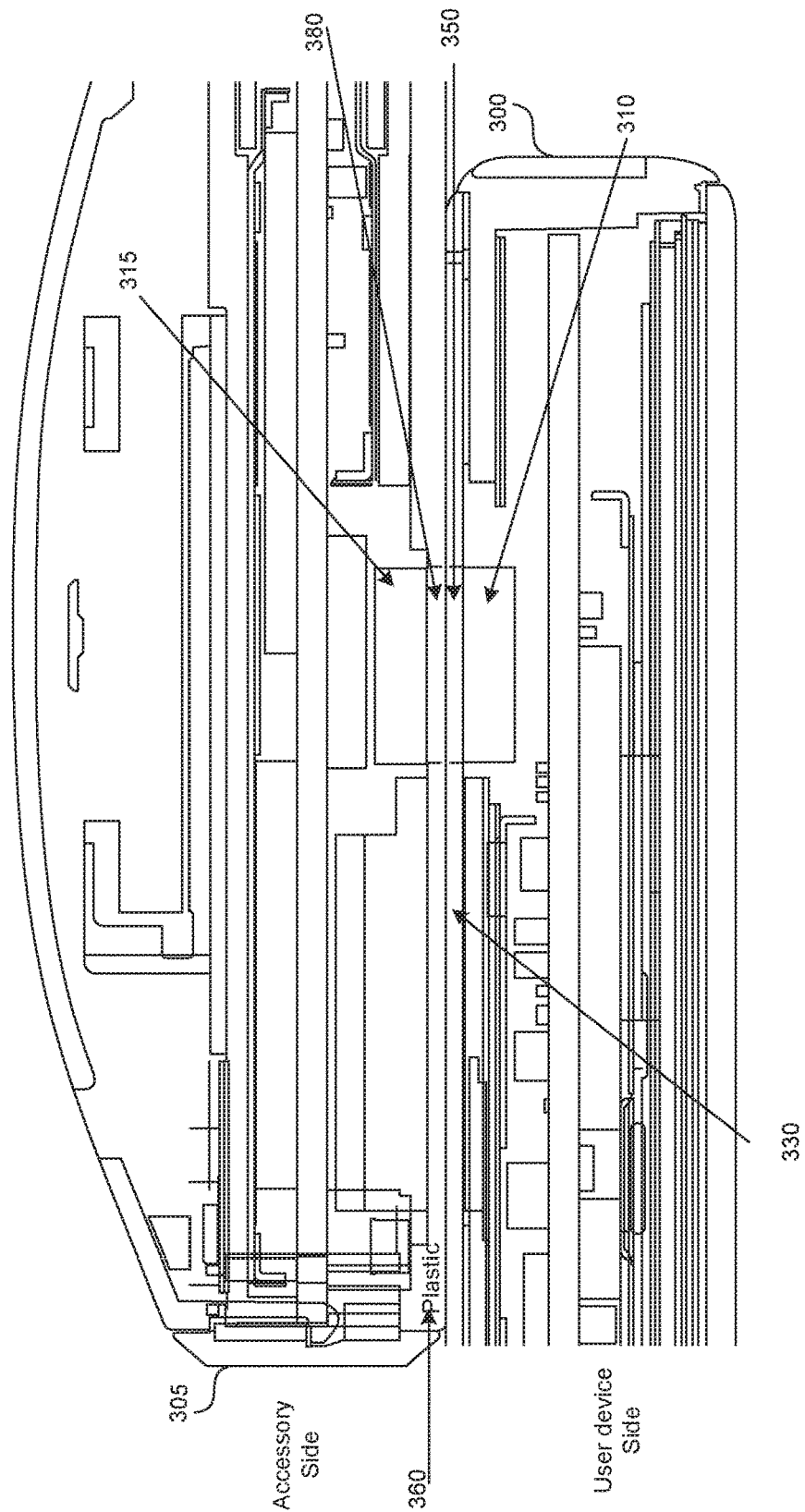
FIGS. 3A-3B show a cross-section of an accessory and a user device in close contact.
Figure 3B:
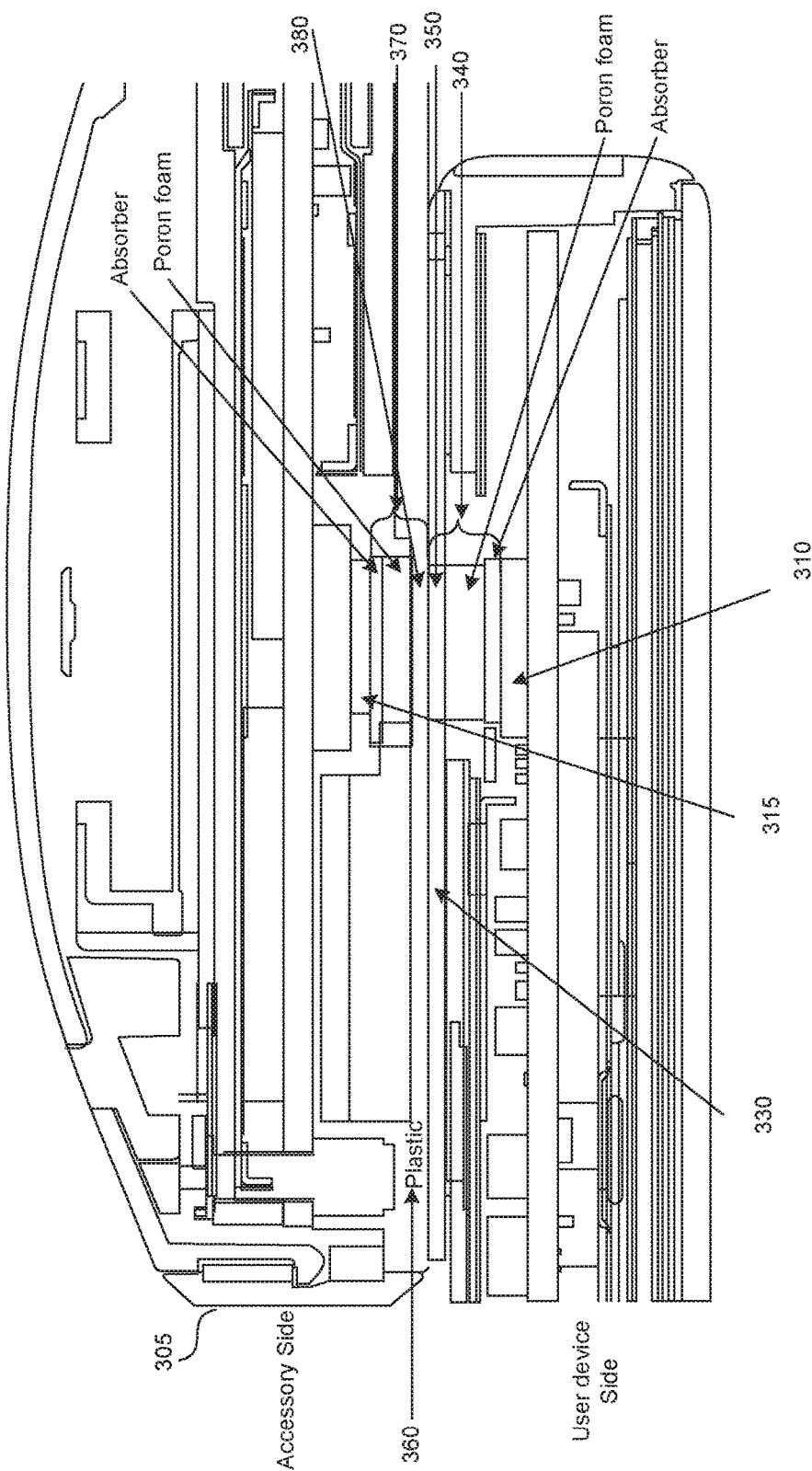

FIGS. 3A-3B show a cross-section of an accessory and a user device in close contact. The user device 300, and the accessory 305 can communicate with each other using extremely high frequency transceivers. The user device 300 can contain extremely high frequency transceiver 310, while the accessory 305 can contain the corresponding extremely high frequency transceiver 315. The communication can include exchange of data and/or transfer of power. The communication can be in the range between 30 GHz to 90 GHz, or 30 GHz to 300 GHz; preferably at 60 GHz.

The extremely high frequency electromagnetic waves, also known as millimeter waves, have a wavelength between 1 mm and 10 mm, inclusive, and the frequency range between 30 GHz and 300 GHz. Compared to lower bands, radio waves in this band have high atmospheric attenuation: they are absorbed by the gases in the atmosphere and the absorption increases with frequency. Absorption by humidity in the atmosphere is significant, and attenuation by rain (rain fade) is a serious problem even over short distances. Absorption is maximum at a few specific absorption lines, mainly those of oxygen at 60 GHz and water vapor at 24 GHz and 184 GHz.

Consequently, to minimize absorption of the millimeter waves, an atmospheric gap between the user device 300 and the accessory 305 can be minimized using an attachment mechanism. The attachment mechanism between the accessory and the user device can reduce the scattering of the millimeter wave frequencies by ensuring that the millimeter waves travel in the shortest path between the two transceivers 310, 315. In other words, the millimeter waves travel substantially perpendicularly to the transmission stack 340, 370, and the chassis 330, 360. The attachment mechanism can contain one or more attachment mechanisms. As shown in FIG. 2, the attachment mechanism can contain both a magnet 208, and a pin 204. The pain 204 can be a protrusion, which locks into a corresponding recess on the mating device. The pin 204 can serve a dual purpose, as an attachment and as a power transfer mechanism between the accessory and the user device.

The user device 300 can contain a dielectric member through which the extremely high frequencies travel. The dielectric member is designed to not attenuate the extremely high frequencies, for example frequencies in the range 30 GHz to 300 GHz. The dielectric member is designed to resonate and create standing waves of the extremely high frequencies by adjusting the thickness of the dielectric member, geometry of the dielectric member, and/or material from which the dielectric member is made. Similarly, the dielectric member can attenuate frequencies below 30 GHz, such as frequencies generated by the electronic circuitry within the user device and/or accessory. For example, the electromagnetic frequencies generated by the processor, or by the cellular antenna within the user device are attenuated when traveling through the dielectric member, thus minimizing interference with the extremely high frequencies received by the transceiver 315. As shown in FIG. 3A the dielectric member can be the chassis 330 of the user device 300. As shown in FIG. 3B, the dielectric member can contain a transmission stack 340 including various layers such as the chassis 330, PORON foam, and an absorber. PORON is a fine pitch open cell urethane foam produced by Rogers Corporation.

The chassis 330 can be made out of a ceramic material such as zirconium, because zirconium is crack resistant and provides protection against impact. If the chassis 330 cracks, the introduction of air into the chassis 330 can change the dielectric properties of the dielectric member, thus impeding the wireless communication between the accessory and the user device 300.

As described in more detail within this application, the thickness of the chassis 330 through which the extremely high frequencies travel, can be tuned to create a standing wave in the 30 GHz to 300 GHz range, thus facilitating the transmission of the millimeter electromagnetic waves. Consequently, the thickness of the chassis 330 through which the extremely high frequencies travel can be higher or lower than the rest of the chassis as seen in FIG. 3A. Further, the region 350 of the chassis through which the extremely high frequencies travel can be made of a different material than the rest of the chassis 330. For example, the rest of the chassis 330 can be made out of titanium, while the region 350 is made out of plastic or zirconium.

The extremely high frequency transceiver 315 of the accessory 305 can communicate with the user device 300 through a dielectric member. The dielectric member can be the chassis 360 of the accessory 305 as shown in FIG. 3A, or through a transmission stack 370 as shown in FIG. 3B. The transmission stack 370 can include the chassis 360 of the accessory 305, PORON foam, and an absorber. The thickness of the chassis 360 through which the extremely high frequencies travel, can be adjusted to facilitate the transmission of the extremely high frequencies. Consequently, the thickness of the chassis 360 through which the extremely high frequencies travel, can be higher or lower than the thickness of the rest of the chassis 360. Further, a region 380 of the chassis 360 can be made of a different material than the rest of the chassis 330. For example, the rest of the chassis 360 can be made out of plastic, while the region 380 can be made out of ceramic. The user device 300 and the accessory 305 can communicate with each other even if one of them has a transmission stack 340, 370 containing multiple layers, and the other one only has the chassis serving as the transmission stack.

Figure 4A:
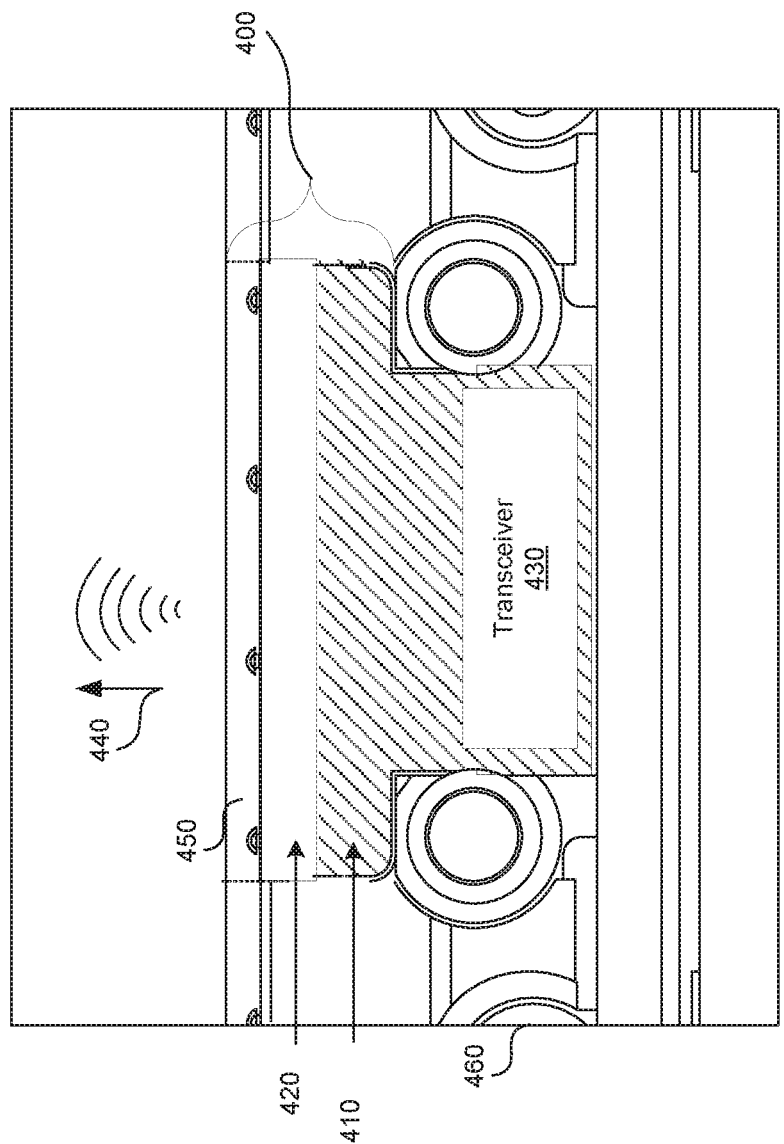
FIG. 4A shows a dielectric member containing an absorber, PORON foam, and a chassis.

FIG. 4A shows a dielectric member containing an absorber, PORON foam, and a chassis. The dielectric member 400 can be made out of one or more layers containing one or more materials. The millimeter waves travel from the extremely high frequency transceiver 430 through the absorber 410, PORON foam 420, and the chassis region 450 of the user device and/or the accessory 460, outwards, in the direction 440. The transceiver 430 can be a SiBeam transceiver or a Keyssa transceiver.

The thickness and the material of the chassis region 450 can be selected to resonate at extremely high frequencies, such as the 30 GHz to 90 GHz range. The chassis region 450 can be made out of ceramic, such as zirconium or porcelain. The thickness of the chassis region 450, when the material is zirconium, is in the range 0.03 mm and 3.2 mm, inclusive. The thickness of the chassis region 450, when the material is porcelain is in the range 0.38 mm to 4.8 mm, inclusive. The chassis region 450 can be made out of plastic with a thickness between 0.46 mm and 7.1 mm, inclusive.

The absorber 410 can surround the transceiver 430 and isolate the transceiver 430 from the electrolytic frequencies generated by the electronics inside the user device and/or the accessory 460. By isolating the transceiver 430, the absorber 410 limits the crosstalk between the internal electronics and the transceiver 430. The absorber 410 can be made out of an appropriate material and have an appropriate thickness to absorb frequencies less than 30 GHz.

For example, the absorber 410 can be made out of flexible and thin magnetically loaded rubber absorbers containing magnetic particles absorbing frequencies in the 1 to 20 GHz range. Examples of such materials are cavity resonance absorbers and surface wave absorbers. The thickness of the magnetically loaded rubber absorbers can vary between 0.25 mm and 3.2 mm. Preferable thickness is 3.2 mm.

In another example, the absorber 410 can be made out of flexible dielectric foam absorbers containing carbon sheets. Examples of such materials are reticulated foam absorbers, lossy foam absorbers, and convoluted foam absorbers. The carbon sheets in the convoluted form absorbers can be arranged in a shape similar to an egg crate, helping with the attenuation of waves in the 1 to 20 GHz range. The thickness of the dielectric foam absorbers can vary between 3.2 mm and 25.6 mm, inclusive.

The PORON foam 420 can serve as a cushion to the transceiver 430, preventing damage to the transceiver 430 from impact. Further, the PORON foam 420 can also be part of the dielectric transmission stack 400. The thickness of the PORON foam 420 can vary between 0.7 mm and 7.9 mm, inclusive. The thickness in the specified range supports the creation of a standing wave in the frequency range between 30 GHz and 90 GHz.

Figure 4B:
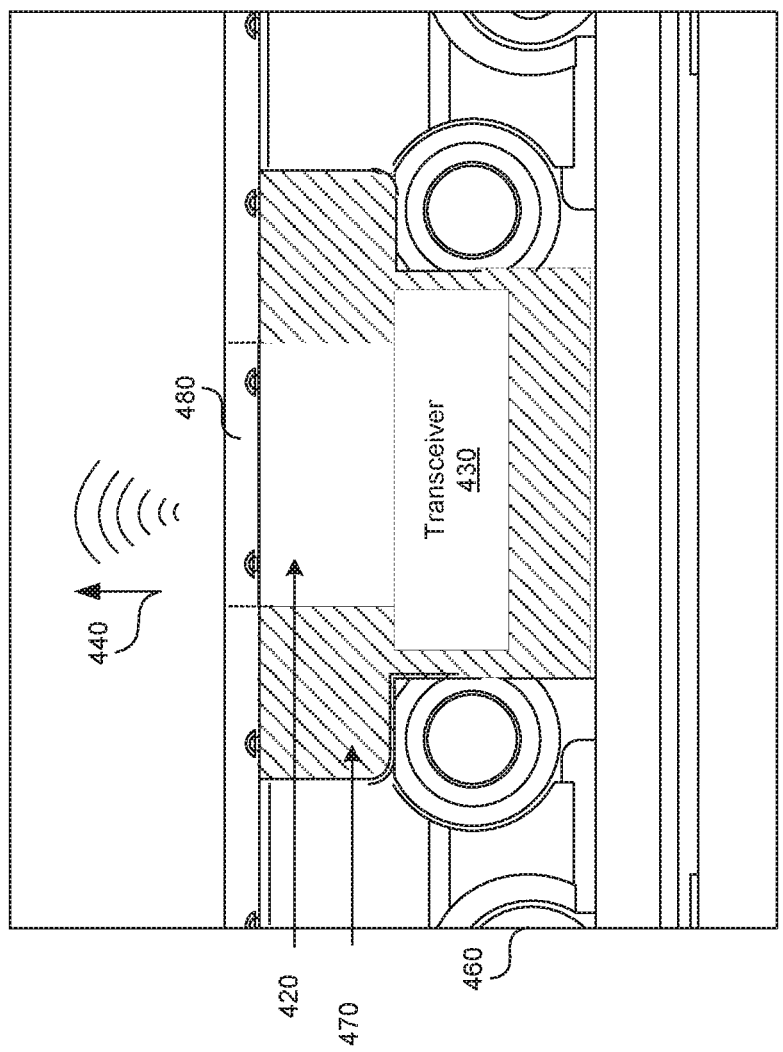
FIG. 4B shows a focusing member directing millimeter waves.

FIG. 4B shows a focusing member directing millimeter waves. Material 470 can act as a focusing member blocking the millimeter waves from passing through. Material 470 can be the PORON foam as shown in FIG. 4A, having a thickness outside of the 0.7 mm to 7.9 mm range. Alternatively, the material 470 can be any other kind of material which does not to resonate at the millimeter wave frequency. By blocking the passage of the millimeter waves, the material 470 effectively can act as a lens, focusing the passage of the millimeter waves through the resonating material 420, and through the chassis region 480. The material 470 can direct the waves towards a region 480 of the chassis which has an appropriate material and/or appropriate thickness to resonate and thus facilitate passage of the millimeter waves through the chassis.

Figure 5:
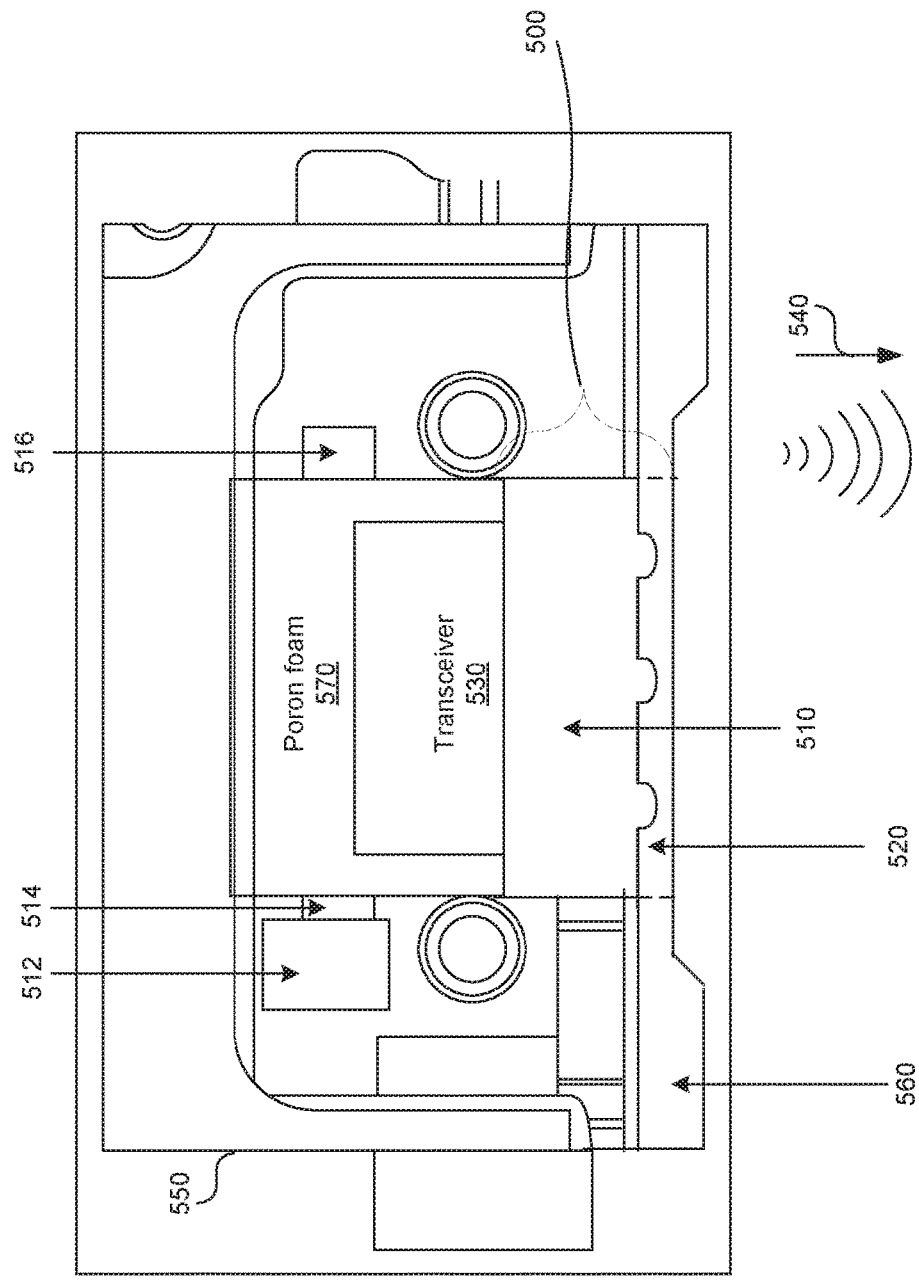
FIG. 5 shows a dielectric member containing an absorber and a chassis region.

FIG. 5 shows a dielectric member containing an absorber and a chassis region. The dielectric member 500 can include the absorber 510, and the chassis region 520 of the user device and/or accessory 550. The extremely high frequency transceiver 530 can transmit the millimeter waves through the absorber 510 and the chassis region 520, in the direction 540.

The absorber 510 can attenuate the electromagnetic waves emitted by an antenna inside the user device and/or accessory 550, or electromagnetic waves emitted by other electronics inside the user device and/or accessory 550. Typically the frequency emitted by the electronics inside the user device and/or accessory 550 is below 3 GHz. The frequency emitted by the antenna is below 3 MHz. Thus, as described in this application, the absorber 510 can be designed to attenuate frequency below 3 GHz, while resonating at frequency at 30 GHz to 300 GHz. In effect, the absorber 510 can act as a bandpass filter at the desired frequency.

The absorber 510 can be part of the dielectric member 500, in which case the thickness of the absorber needs to be in the specified range, as described in this application. The absorber 510 which is part of the dielectric member 500 can have a shape designed to absorb the frequencies below 3 GHz and/or to resonate at frequencies between 30 GHz and 300 GHz. As shown in FIG. 5, the absorber 510 can have a shape resembling that of an egg crate. The absorber 512, 514, 516 can be placed outside of the dielectric member 500, surrounding, and isolating the transceiver 530 from other electronics inside the user device and/or accessory 550.

The chassis region 520 can be designed to resonate in the millimeter wave frequencies. For example, the chassis region 520 can be made out of a particular material such as ceramic, or plastic. Depending on the chosen material, the chassis region 520, or the whole chassis can be manufactured to have a particular thickness, as described in this application, which enables the chassis region 520 to resonate, i.e., facilitate the transmission of the millimeter waves. As seen in FIG. 5, the chassis region 520 can have a thickness different from the remainder of the chassis 560.

The PORON foam 570 inside the user device and/or accessory 550 can be outside of the dielectric member 500. The PORON foam 570 can cushion the transceiver 530 from impact. The PORON form 570 can surround the transceiver 530. When the PORON foam 570 is not within the transmission stack, the PORON foam can have a thickness outside of the 0.7 mm and 7.9 mm range.

Figure 6:
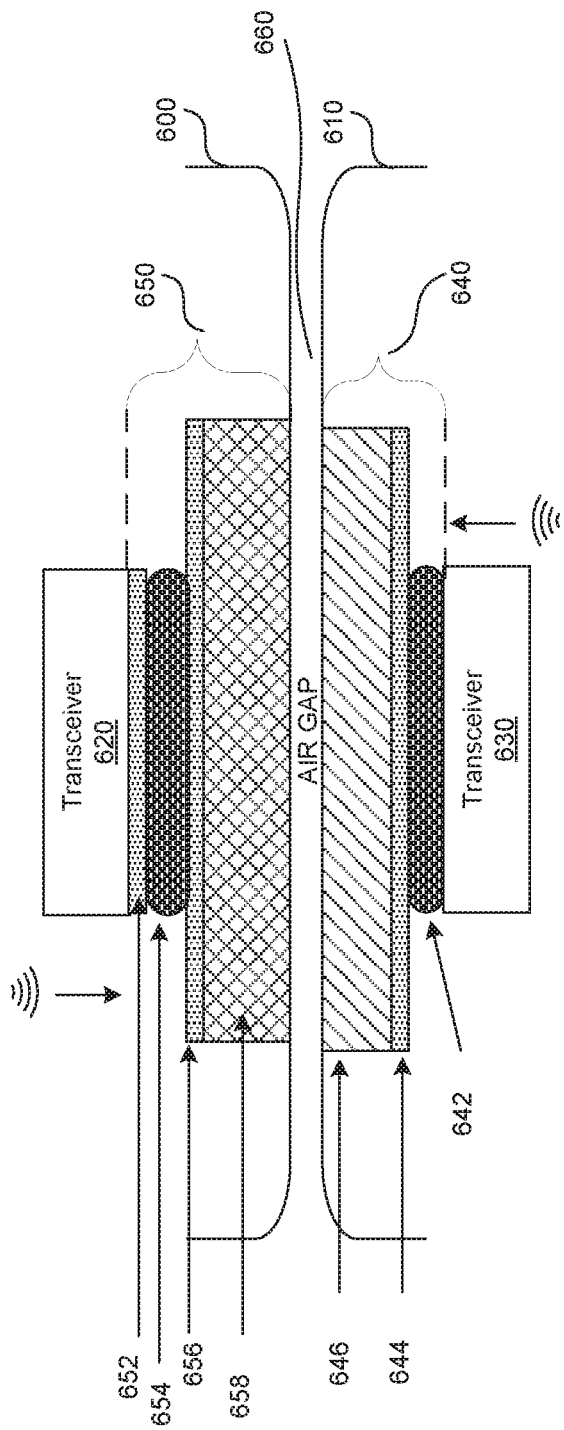
FIG. 6 shows a transmission stack in two devices communicating at the millimeter wavelength between each other.

FIG. 6 shows a transmission stack in two devices communicating at the millimeter wavelength between each other. The devices 600, 610 communicate with each other using the extremely high frequency transceivers 620, 630, respectively. The millimeter waves emitted by the transceiver 620, 630 travel through to transmission stacks 640, 650, associated with the devices 600, 610 respectively. The transmission stacks 640, 650 act as a dielectric member resonating at the extremely high frequencies, while blocking frequencies outside of the millimeter wave range. In effect, the transmission stacks 640, 650 act as a bandpass filter, resonating at the desired frequencies, and blocking other frequencies from passing. The transceivers 620, 630 can emit frequencies in the 30 to 90 GHz range, preferably around 60 GHz.

The transmission stack 640 can include multiple layers such as foam or putty 642, glue 644, and plastic 646. The outer layer 646 of the transmission stack 640 can form a region of the chassis, or the whole chassis of the device 610 can be made out of the same material as the outer layer. The thickness of the plastic 646 can vary between 0.46 mm and 7.1 mm, inclusive. When layer 642 is made out of foam, the thickness of the foam layer can vary between 0.7 mm and 7.9 mm, inclusive. When layer 642 is made out of putty, the thickness of putty layer 642 can vary between 0.36 mm and 3.7 mm, inclusive. The putty layer 642, in addition to acting as a bandpass filter in the resonator, can dissipate heat generated by the transceiver 620. The thickness of the glue layer 644 can vary between 0.4 mm and 5.4 mm inclusive.

Transmission stack 650 can be the same as the transmission stack 640, or can have different and/or additional layers. The transmission stack 650 can include layers such as glue 652, foam or putty 654, another layer of glue 656, and zirconium 658. The thicknesses of the various layers are as described in this application.

The two transceivers 620, 630 can communicate with each other when the outer layers 646, 658 press against each other, creating an air free environment between the outer layers 646, 658. However, the two transceivers 620, 630 can communicate with each other even if there is a thin layer of air 660 between the devices 600, 610. The thickness of the thin layer of air can vary between 0.9 and 9 mm. When the two transceivers 620, 630 communicate at 60 GHz, the air gap between the devices 600, 610 can be approximately 0 mm, or approximately 2 mm.

The attachment mechanisms described in this application, such as magnets 208 in FIG. 2, can be designed to ensure that the air gap has an appropriate thickness. Further, the attachment mechanism can ensure that the distance between the transceivers 620, 630 is minimal, thus minimizing the amount of the transmission stacks 640, 650, through which the millimeter waves have to travel. In other words, the attachment mechanism ensures that the millimeter waves travel in a substantially perpendicular direction through the transmission stacks 640, 650, between the transceivers 620, 630.

When the two transceivers 620, 630 communicate with each other at 60 GHz, the preferred thickness of the various layers in the transmission stacks 640 650 is as follows. The preferred thickness of PORON foam layer 642, 654 can be 1.5 mm to 1.59 mm. The preferred thickness of putty layer 642, 654 can be 0.7 mm to 0.76 m. The preferred thickness of the glue layer 644, 652, 656 can be .8 mm to 1.1 mm. The preferred thickness of the plastic layer 646 can be 0.8 mm to 1.1 mm. The preferred thickness of the zirconium layer 658 can be between 0.6 mm to 0.64 mm.

Figure 7:
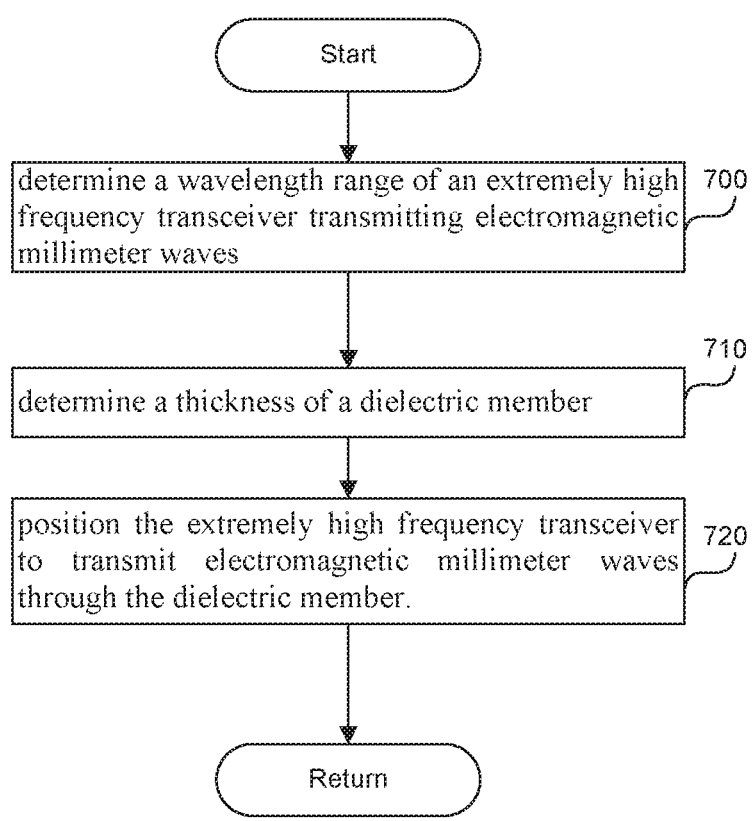
FIG. 7 is a flowchart of a method to manufacture an extremely high frequency transceiver within a user device.

FIG. 7 is a flowchart of a method to manufacture an extremely high frequency transceiver within a user device. A processor performing various steps shown in FIG. 7 can be a processor of an automated manufacturing system.

In step 700, a processor can determine a wavelength range of an extremely high frequency transceiver transmitting electromagnetic millimeter waves. The extremely high frequency range is defined as electromagnetic frequencies between 30 GHz and 300 GHz. The extremely high frequency transceiver can transmit frequencies in the whole range, or in a subset of the whole range. For example, the extremely high frequency transceiver can transmit frequencies in the 30 GHz to 90 GHz range. In another example, the extremely high frequency transceiver can transmit frequencies in approximately 60 GHz range. To determine the wavelength range, the processor can measure the wavelength range of the transceiver, and/or can select a transceiver emitting/receiving frequencies in the desired range.

In step 710, a processor can determine a thickness of a dielectric member facilitating the transmission of the electromagnetic millimeter waves by determining a dielectric constant of the dielectric member, increasing the thickness with increasing wavelength range, and decreasing the thickness with increasing dielectric constant. For example, the processor can vary the thickness of the dielectric member in proportion to wavelength over square root of the dielectric constant. In another example, the processor can decrease the thickness of the dielectric member in inverse proportion to the square root of the dielectric constant.

To determine the dielectric constant of the dielectric member, the processor can determine a temperature at which the user device associated with the transceiver operates. Based on the temperature, the processor can look up in a database the dielectric constant of a material in the dielectric member. Additionally, the processor can also adjust the temperature of the material to the operating temperature of the user device, and measure the dielectric constant of the material at the given temperature.

In step 720, a processor can position the extremely high frequency transceiver to transmit electromagnetic millimeter waves through the dielectric member. The dielectric member, having the appropriate thickness, can act as a bandpass filter for the waves emitted by the extremely high frequency electromagnetic transceiver. In effect, the dielectric member attenuates the waves outside of the desired frequency range, while transmitting the waves inside the desired frequency range. For example, the dielectric member can create a standing wave of the desired frequency.

The processor can determine the dielectric constant by retrieving the dielectric constant from a database, or by measuring the dielectric constant of the dielectric member at a given temperature. Upon determining the dielectric constant, the processor can shape the dielectric member into the determined thickness. As described in this application, the dielectric member can be made out of the same material as the rest of the device chassis, or can be a region of the device chassis substantially perpendicular to the transceiver.

The processor can shape the layers of the dielectric member into the appropriate thicknesses, as described in supplication. For example, the processor can shape a layer of foam into a thickness between 0.7 mm and 7.9 mm, inclusive. The processor can shape a layer of glue into a thickness between 0.4 mm and 5.4 mm, inclusive. The processor can shape a layer of ceramic into a thickness between 0.46 mm and 7.1 mm, inclusive.

Computer

Figure 8:
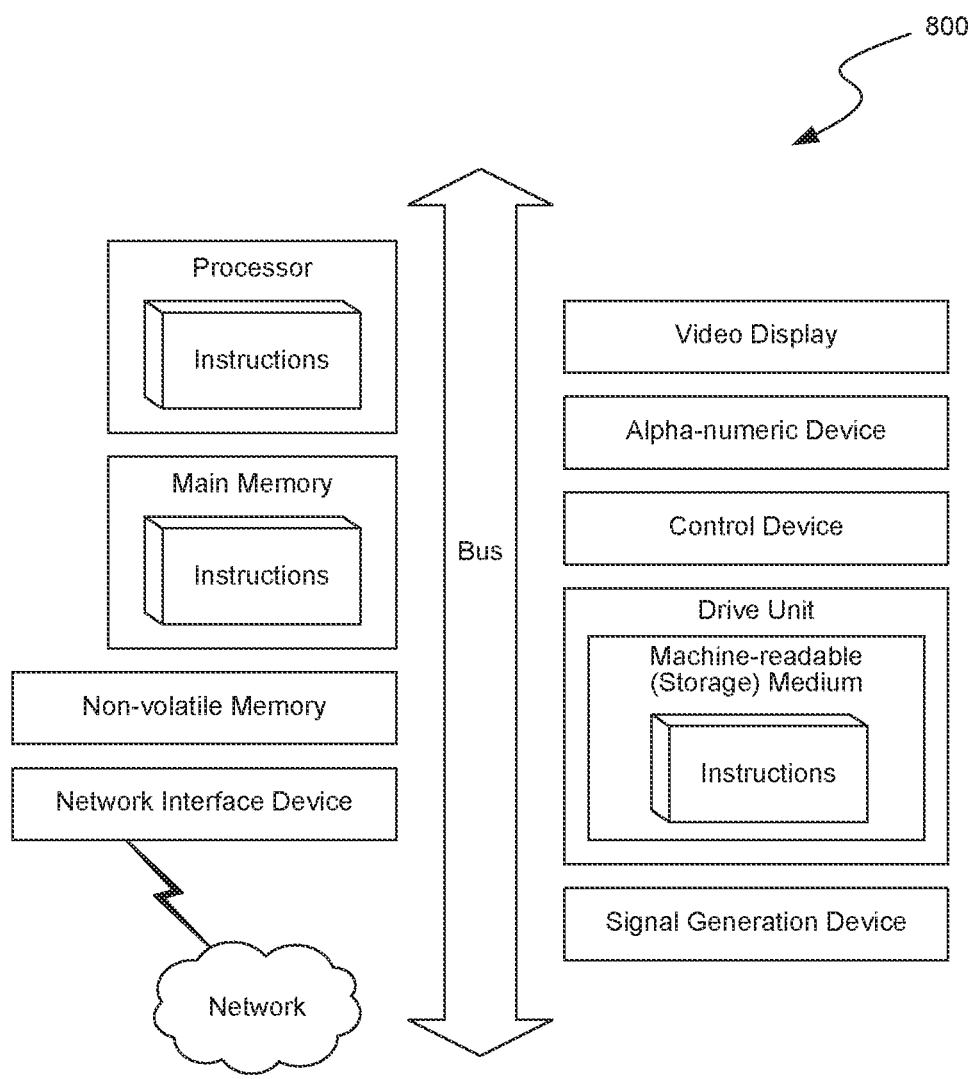
FIG. 8 is a diagrammatic representation of a machine in the example form of a computer system within which a set of instructions, for causing the machine to perform any one or more of the methodologies or modules discussed herein, may be executed.

FIG. 8 is a diagrammatic representation of a machine in the example form of a computer system 800 within which a set of instructions, for causing the machine to perform any one or more of the methodologies or modules discussed herein, may be executed.

In the example of FIG. 8, the computer system 800 includes a processor, memory, non-volatile memory, and an interface device. Various common components (e.g., cache memory) are omitted for illustrative simplicity. The computer system 800 is intended to illustrate a hardware device on which any of the components described in the example of FIGS. 1-7 (and any other components described in this specification) can be implemented. The computer system 800 can be of any applicable known or convenient type. The components of the computer system 800 can be coupled together via a bus or through some other known or convenient device.

The processor of the computer system 800 can be the processor manufacturing the devices described in this application. Further, the processor can be a processor of the user device and/or the accessory, as described in this application.

This disclosure contemplates the computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 800. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A mobile device to communicate with a mobile device accessory at extremely high electromagnetic frequencies, the mobile device comprising:
    an extremely high frequency transceiver communicating within 30 GHz to 90 GHz range, the extremely high frequency transceiver associated with the mobile device transmitting 30 GHz to 90 GHz electromagnetic frequencies through a region of a chassis of the mobile device to a second extremely high frequency transceiver associated with the mobile device accessory;
    the chassis of the mobile device comprising a ceramic material forming the region of the chassis of the mobile device, a thickness of the ceramic material in a range between 0.03 mm and 1.5 mm, inclusive, creating a standing wave of the 30 GHz to 90 GHz electromagnetic waves passing through the ceramic material; and
    a dielectric member comprising:
        a layer of foam having a thickness between 0.7 mm and 7.9 mm, inclusive;
        a layer of glue having a thickness between 0.4 mm and 5.4 mm, inclusive; and
        a layer of plastic having a thickness between 0.46 mm and 7.1 mm, inclusive.

2. The mobile device of claim 1, the ceramic material comprising zirconium.

3. A system comprising:
    an extremely high frequency transceiver associated with a mobile device transmitting millimeter electromagnetic waves through a region of a chassis of the mobile device to a second extremely high frequency transceiver associated with a mobile device accessory; and
    a dielectric member forming the region of the chassis of the mobile device, wherein a thickness of the dielectric member facilitates transmission of the millimeter electromagnetic waves through the dielectric member and attenuates transmission of electromagnetic waves having a frequency less than 30 GHz, the dielectric member comprising:
        a layer of foam having a thickness between 0.7 mm and 7.9 mm, inclusive;
        a layer of glue having a thickness between 0.4 mm and 5.4 mm, inclusive; and
        a layer of plastic having a thickness between 0.46 mm and 7.1 mm, inclusive.

4. The system of claim 3, the dielectric member comprising an absorber layer attenuating transmission of electromagnetic waves having the frequency less than 30 GHz, and a PORON foam layer.

5. The system of claim 3, the thickness of the dielectric member smaller than a thickness of a remainder of the chassis.

6. The system of claim 3, the dielectric member comprising ceramic.

7. The system of claim 6, the thickness of the dielectric member comprising a range between 0.03 mm and 3.2 mm, inclusive.

8. The system of claim 3, the dielectric member comprising plastic.

9. The system of claim 8, the thickness of the dielectric member comprising a range between 0.46 mm and 7.1 mm.

10. The system of claim 3, comprising an absorber proximate to the extremely high frequency transceiver, the absorber reducing interference between the extremely high frequency electromagnetic waves and electromagnetic waves generated by a remainder of the mobile device.

11. The system of claim 3, comprising a focusing member directing the millimeter electromagnetic waves toward the dielectric member by attenuating the millimeter electromagnetic waves traveling through the focusing member.

12. The system of claim 3, the dielectric member comprising:
    a layer of putty having a thickness between 0.36 mm and 3.7 mm, inclusive;
    the layer of glue having a thickness between 0.4 mm and 5.4 mm, inclusive; and
    a layer of zirconium having a thickness between 0.03 mm and 3.2 mm, inclusive.

13. The system of claim 3, comprising a layer of air between the mobile device and the mobile device accessory, the layer of air having a thickness of at most 3 mm.

* * * * *